July 7, 1931. M. B. KERR Re. 18,126

SIGNALING SYSTEM

Original Filed June 19, 1925 2 Sheets-Sheet, 1

INVENTOR
M. B. KERR
BY
J. W. Schmied
ATTORNEY

July 7, 1931. M. B. KERR Re. 18,126

SIGNALING SYSTEM

Original Filed June 19, 1926 2 Sheets-Sheet 2

INVENTOR
M. B. KERR
BY J. W. Schmied
ATTORNEY

Reissued July 7, 1931 Re. 18,126

UNITED STATES PATENT OFFICE

MARK B. KERR, OF ROSEBANK, STATEN ISLAND, NEW YORK, ASSIGNOR TO BELL TELEPHONE LABORATORIES, INCORPORATED, OF NEW YORK, N. Y., A CORPORATION OF NEW YORK

SIGNALING SYSTEM

Original No. 1,680,550, dated August 14, 1928, Serial No. 117,047, filed June 19, 1926. Application for reissue filed November 17, 1928. Serial No. 320,132.

This invention relates to transmission systems, and more particularly to systems adapted for long telegraph lines such as submarine cables and the like.

An object of the invention is to improve telegraph or other transmission systems by enabling an increase in the speed at which signal currents may be sent over the line without detrimental effects upon the message.

In operating telegraph apparatus by reversals of current over long transmission lines, the signaling currents are so reduced in strength by the action of the resistance, electrostatic capacity and inductance of the line, that the speed of transmission is limited to that at which the short pulses, after being amplified at the receiving end of the line, are just strong enough to operate a line relay which is utilized for the purpose of regenerating the pulse currents so as to effect a complete registration of the message. Moreover, the effect of the attenuation of such lines on these transmitted signals is to reduce the amplitude of the short pulses to a greater extent than the long ones. It has been proposed heretofore to employ vibrating relays controlled from the distributor at the receiving station to supply pulses which may be lost in transmission.

In accordance with the present invention, however, there is provided a system in which the vibrating relay, which co-acts with the distributor to supply impulses which have been lost in transmission, has a line winding independent of the distributor and which is continually in condition to receive signaling impulses. A further advantage in this invention resides in a more simplified rotary distributor being provided, whereby only one set of receiving rings, in addition to those required to operate the printer magnets, is necessary to restore the combination of signals as originally transmitted from the distant office.

Figure 1:
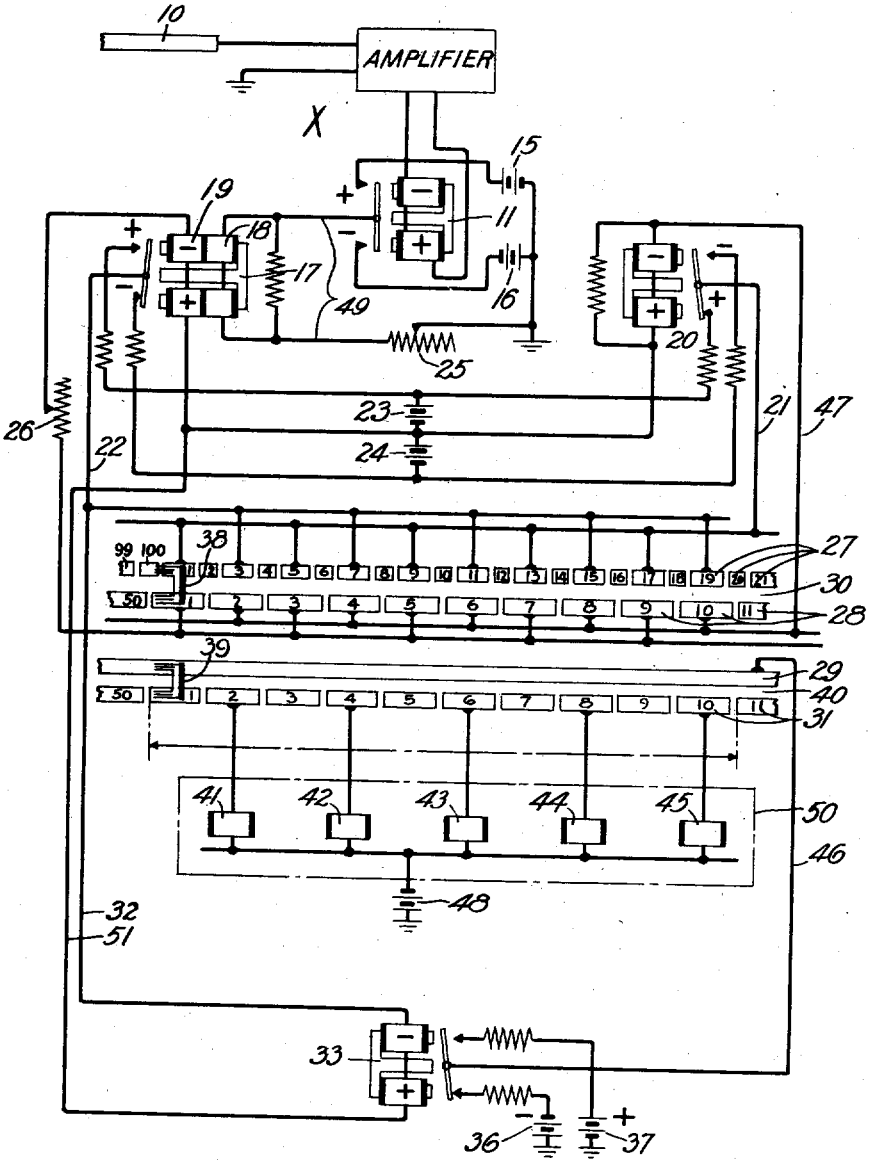
Figure 2:
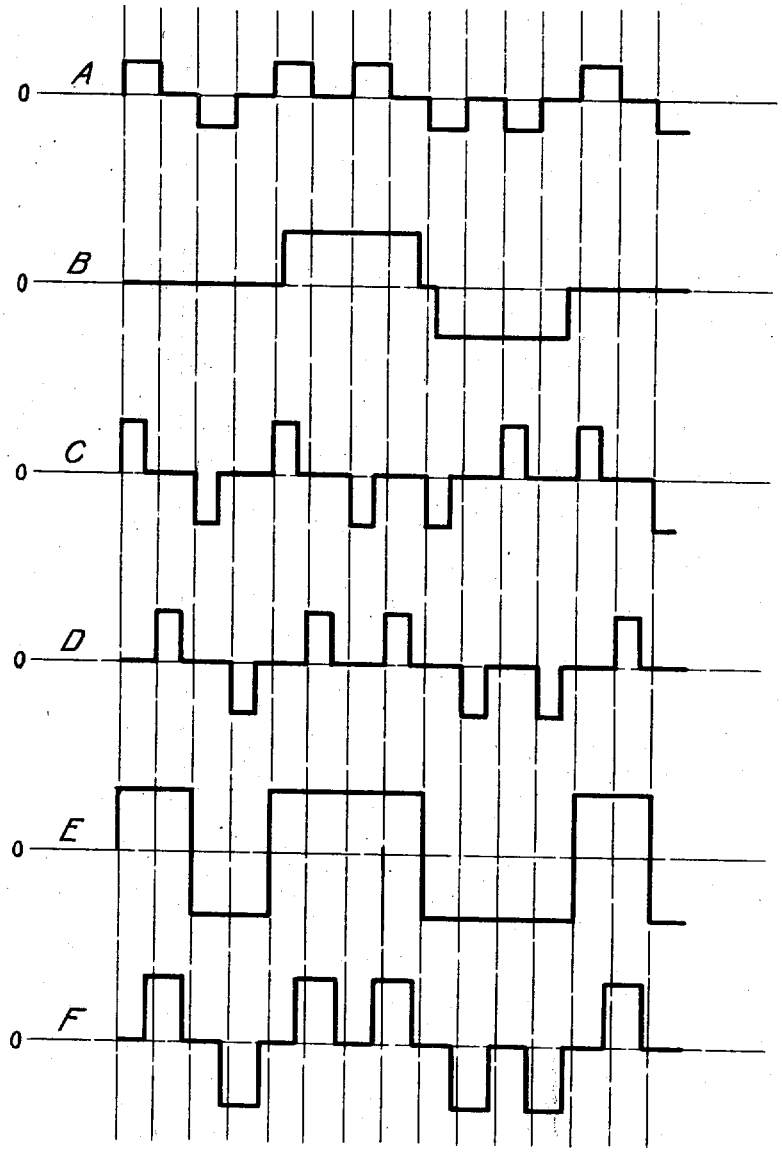

The above and other objects and advantages of this invention are set forth in the following description and appended claims, and may be more readily understood if considered in conjunction with the accompanying drawings illustrating the invention, in which Fig. 1 shows the vibrating relay circuit including the two sets of segmented receiving rings at the receiving distributor, and Fig. 2 shows curves representing the polarities of the signal or message impulses as transmitted and the changes which these pulses undergo during transmission, regeneration and registration.

Referring now to the drawings, there is disclosed the receiving apparatus at station X which is connected by submarine telegraph cable 10 to a distant station (not shown). Each station is provided with a special rotary distributor which is arranged to rotate in synchronism in accordance with practice well known in the art. Of the distributor at station X only the receiving section is shown and this section is shown in part only as representing the segments of one channel. In Fig. 1, cable 10 is shown connected to the input circuit of a space discharge or other type of amplifier. To the output circuit of the amplifier there is connected an amplifier signal relay 11 of the polarized type arranged for three operating positions, namely positive, negative and zero, or neutral. When the transmission speed exceeds what was heretofore known as the cable maximum, the unit length signaling impulses transmitted over the cable are damped down to such an extent that even after amplification they will not operate relay 11 and therefore are lost. In order to fill the gaps introduced in the received signals due to this condition, current impulses in synchronism with the received signals are generated in a vibrating relay circuit which comprises a set of segmented rings 30 of the receiving distributor, line, or vibrating relay 17, and auxiliary vibrating relay 20. Only the incoming line impulses of two or more units length are of sufficient strength after amplification to operate relay 11 and in response to such impulses the relay moves its armature to either its positive or negative position in accordance with the polarity of the impulses in order to regenerate pulses corresponding to those which are received and are of sufficient strength to operate relay 11. Relays 17 and 20 are of the unbiased polarized type and are arranged to be so interconnected through the set of vibrating relay segmented rings 30, that each controls the energizing circuit of the other to cause the armature of each to execute one cycle of movement during each two signal intervals provided no out-of-phase signaling impulses of sufficient strength to control the vibration, are incoming over the line. The movement of the vibrating relay armature controls the printer through the unbiased polarized printer relay 33. The armature of relay 33 vibrates in synchronism with the vibrating relay armature to impress positive and negative potentials alternately upon the printer magnets 41 to 45 inclusive, through the receiving rings 40, during successive signaling intervals, providing the operation is not modified by incoming line impulses. The polarities of the pulses effected by relay 33 will always correspond to those effected by relays 17 and 11. Relay 17 is provided with two polarizing windings, one characterized as a holding winding arranged to be energized by the incoming impulses, and the other as a vibrating winding arranged to be energized by the vibrating circuit. When relay 11 responds to a long pulse incoming over the line, the circuit is closed through the holding winding of relay 17 and the relay is so arranged that the current therethrough predominates over that which may be flowing through the vibrating winding at the same time, and the vibration of the armature of relay 17 is checked, the armature resting against the contact corresponding in polarity to that of the incoming pulse and remaining in such position until the end of the pulse when the vibrations are resumed. In this way the short pulses which are lost in the transmission are replaced by these alternate impulses of positive and negative polarity in their respective positions in the signal combinations, and therefore a complete-record of the signals as transmitted, is obtained.

Before beginning a detailed description of the operation of the arrangement shown in Fig. 1 of the drawings, it would be well to note that the receiving section of the distributor at station X comprises two sets of rings 30 and 40 which have, for the sake of clearness, been shown developed. Section 30 consists of two rings, both divided into segments, which are adapted to be bridged by brush 38, and set 40, likewise consisting of two rings, has one ring continuous and the other segmented, both rings being bridged by brush 39. Brushes 38 and 39 are secured to an arm (not shown) which is arranged to be continuously rotated by means of a motor (also not shown). Assuming that the distributor is designed to transmit over five channels the ring 28 is divided into fifty equal segments, ten of which are shown as representing one channel. Ring 27 forming part of set 30 with ring 28 is divided into a hundred segments of two different lengths, the odd numbered segments representing those of the long length and the even numbered segments representing those of the short length. The odd numbered segments are alternately connected and arranged in two groups, each group being respectively connected to the armatures of the vibrating relays 17 and 20. The even numbered segments are dead and are provided as buffers to prevent short circuits between the armatures of the relays 17 and 20 as the brush passes from segment to segment. The segments of ring 28 are likewise connected alternately and arranged in two groups, one group being connected to a winding of relay 17, and the other to the winding of relay 20. The odd numbered, or long, segments of ring 27 are arranged so that their centers are located on radial lines with the centers of their respectively adjacent segments of ring 28. The ring set 40 which constitutes the receiving rings proper, has its continuous ring 29 connected to the armature of printer relay 33 and its segmented ring 31 which is divided into fifty equal parts, is arranged to have its even numbered segments connected to the selector magnets of five printers, the magnets of only one printer being shown in the drawings which is sufficient for the purpose of describing the invention. The odd numbered segments of ring 31 are dead and serve as buffers to permit a positive break between the successive pulses to the selector magnets.

The operation of the arrangement shown in Fig. 1 is as follows: When no current flows through the holding winding 18 of the vibrating relay 17, the passage of brush 38 over segments 1 of both rings 27 and 28 closes a circuit from the positive pole of battery 23, plus or positive contact and armature of auxiliary vibrating relay 20, conductor 21, segments 1 of rings 27 and 28, rheostat 26, through the vibrating winding 19 of relay 17 to the negative pole of battery 23, and the current flowing through winding 19 in this circuit will operate relay 17 and thereby move the armature thereof into the same position as that of the auxiliary vibrating relay 20, that is, into connection with its associated positive contact. The operation of relay 17 then closes a circuit extending from the positive pole of battery 23, positive contact and armature of relay 17, conductors 22 and 32, through winding of printer relay 33, conductor 51, to the negative pole of battery 23. Relay 33 operates and connects the positive pole of battery 37 to conductor 46, but inasmuch as segment 1 of ring 31 is dead and brush 39 is passing over this segment, the printer circuit extending over conductor 46 is open and the first pulse through the winding of relay 33 is ineffective at this time. When brush 38, in rotating, bridges segments 3 and 2 of rings 27 and 28 respectively, a circuit is closed through the winding of relay 20 and this circuit may be traced from the positive pole of battery 23, positive contact and armature of relay 17, conductor 22, segments 3 and 2 interconnected by brush 38, conductor 47, through the winding of relay 20 to the negative pole of battery 23. Relay 20 now operates and moves its armature into connection with its negative contact. While brush 38 is passing over and bridging segments 3 and 2, brush 39 is bridging the continuous ring 29 and segment 2 of ring 31, and since the operation of relay 17 had caused the operation of relay 33, the circuit prepared at the positive contact of relay 33 is now completed over brush 39, segment 2, through the winding of selector magnet 41 of the printer and the negative pole of battery 48, and magnet 41 operates in response to the first pulse.

As brush 38 continues to rotate, the next segments to be bridged thereby are 5 and 3 of their respective rings 27 and 28 and at this time a circuit is closed extending from the positive pole of battery 24, through the winding 19 of relay 17, rheostat 26, segments 3 and 5, conductor 21, armature and negative contact of relay 20 to the negative pole of battery 24. Relay 17 again operates and reverses the position of its armature to connect with the negative contact in order to correspond with the position of the armature of relay 20 and to cause a negative current to flow through the winding of relay 33. Relay 33 operates and reverses the position of its armature to connect the negative pole of battery 36 to continuous ring 29, but since bridge 39 is bridging dead segment 3 and the continuous ring, no circuit is completed. When bridge 38 reaches segments 7 and 4 of their respective rings 27 and 28, the circuit closed at this time extends from the positive pole of battery 24, through the winding of relay 20, conductor 47, segments 4 and 7, conductor 22, armature and negative contact of relay 17 to the negative pole of battery 24. Relay 20 operates for the second time and its armature is positioned against the positive contact. Simultaneously with the rotation of brush 38 over segment 4 of ring 28, brush 39 is in contact with segment 4 of ring 31 and as the latter segment is connected with selector magnet 42, a circuit previously prepared when the armature of relay 33 was connected to the negative pole of battery 36, is completed. However, magnet 42 does not operate in this circuit because similar polarities exist at the opposite ends of the circuit.

A repetition of these reversals is effected in the vibrating circuit as brushes 38 and 39 continue to rotate over their respective ring sets 30 and 40. It is clear, then, that when no opposing current is flowing through holding winding 18, the vibrating relay 17 will operate in response to the impulses produced by brush 38 in passing over the odd numbered segments of ring 28 and that the operation of relay 17 will cause the auxiliary relay 20 to reverse the position of its armature as the brush advances to the next even numbered segment, the latter operation, that is, the reversal of the armature, being effective to reverse the next vibrating impulse to the printer.

When the incoming signals, that is, those of two or more pulses, are of sufficient strength after amplification to operate relay 11, a current impulse is sent through the signal loop 49 and the holding winding 18 of relay 17. If the current thus produced in winding 18 is opposite in polarity to that flowing simultaneously in winding 19, relay 17 will be prevented from vibrating and the armature thereof will be held in the position in which it was previously moved. The auxiliary relay 20 will also be prevented from vibrating and the polarity of the next vibrating pulse through the winding of relay 17 will be the same as the previous one, thereby again tending to move the armature of relay 17 away from the contact against which it is resting. The polarity of the holding winding 18 is so arranged that the current impulses flowing therethrough cause the armature of relay 17 to move in the same direction as that of relay 11, and by adjusting the relative strengths of the loop and the vibrating current impulses by means of rheostats 25 and 26 respectively, the current in the loop circuit is made stronger than that in the vibrating circuit so that relay 17 will follow the operations of relay 11 irrespective of the polarity of the current impulses sent simultaneously through the vibrating winding 19. The minimum strength of the current impulses in the vibrating relay is set by means of rheostat 26 to be just strong enough to operate the relay 17 when the signal loop 49 is open. With this arrangement the vibrating impulses control the operation of relay 17 only when the signal loop is open.

Inasmuch as the brush 38 is mounted on the same brush arm (not shown) as the receiving brush 39, the vibrating impulses will be in synchronism with the unit impulses of the signals received from the line or cable, provided, of course, that brush 39 is in synchronism with such signals. It is clear then that if any of the unit length impulses of the received signals are dropped out by the failure of the amplifier signal relay 11 to make contact on either side, there will always be a vibrating pulse flowing in the vibrating winding 19 of relay 17 at the same instant so as to cause relay 17 to operate and re-insert such pulses. Therefore the operations of relay 17 resulting from the combined control of the holding and the vibrating windings actually reproduce the signals as they were originally sent out from the distant sending distributor and these signals are sent to the printer through relay 33, where a record is made to show the completed signal combinations as originally transmitted.

In Fig. 2 there is shown a series of curves representing the currents in the various circuit arrangements shown in Fig. 1, together with the polarities of the signals as actually transmitted and then as reproduced at the receiving station to operate the printer. In this figure the horizontal lines which form a part of the gridiron shown, represent the zero of the respective currents, and the vertical lines mark off along the zero lines the signal intervals, each interval being shown in halves in order to indicate the curbed portion of each of the signals transmitted from the distant office.

Curve A represents the current polarities of a number of arbitrarily selected signals which are transmitted from the sending segments of the distributor at the distant office. It will be noted that here are shown seven signals, but it is understood that the first five constitute a message character for the channel to which printer 50 is adapted. It will also be noted that these signals consist of individual current impulses of positive and negative polarity separated from each other by spaces or time intervals equal to the length of the pulses, during which the cable is earthed. In accordance with the curbing characteristic of submarine cable transmission whereby it has been found that if the cable is earthed for one half of each signal, the outgoing pulses upon arriving at the receiving end will be much less distorted. This curbing is provided for at the sending distributor by furnishing two segments for each signal interval, the second segment being grounded so as to check the current flow through the second half of each interval. Referring to the signal selected for illustration, the polarity of the first current impulse is positive; that of the second, negative; third and fourth, positive; fifth and sixth, negative; and the seventh, positive. In this combination of signals, the pulses of the first, second, and seventh signals intervals are of the short type and those of the third and fourth, and fifth and sixth are of the long type.

Curve B represents the current flow in holding winding 18 of relay 17, shown in Fig. 1, effected by the operation of relay 11. As hereinbefore stated, only the long pulses are amplified sufficiently to operate relay 11 and therefore no current is received in winding 18 during the intervals in which the short pulses of alternate polarities are being transmitted. It will be noted that curve B shows a continuous impulse transmitted into winding 18 for each of the longer transmitted impulses in curve A. This is due to the characteristic of the received signaling impulses that flow in the windings of relay 11 from the output of the amplifier. As is well known in submarine cable telegraphy the earthed intervals between the individual impulses of the outgoing curbed signals are obliterated during transmission and the received signals appear as continuous waves.

Curves C and D show the nature of the current impulses flowing through vibrating winding 19 of relay 17 and the winding of relay 20 respectively. These impulses are shorter in point of time than those shown in curve A because the live segments shown in Fig. 1 are correspondingly shorter than those of the sending distributor at the distant office. As shown in curve B the first long pulse to be received in winding 18 begins during the third signal interval. Therefore the vibrating circuit including relays 17 and 20 has control over the printer relay 33 and is consequently furnishing to the printer short impulses of alternate polarities in place of those which are lost in transmission during the first and second intervals. In curve C the current passing through vibrating winding 19 of relay 17 during the third interval is of the same polarity as the long pulse in winding 18. Therefore the armature of relay 17 will operate as in the vibrating circuit to cause a reversal of current in the circuit extending through the winding of relay 20 when brush 38 rotates over segment 6 of ring 28 during the latter half of the interval and this current is shown in curve B to be positive. Relay 20 operates and when brush 38 rotates to segment 7 of ring 28 for the fourth interval, a circuit is completed through winding 19 and the current therein is reversed to negative as shown in curve C. But inasmuch as the long positive pulse is still flowing in winding 18 the armature of relay 17 remains in the position in which it was set during the third interval and the negative current through winding 19 at this time becomes ineffective to operate the relay so that the usual alternations in current produced by the vibrating circuit are checked by the long positive pulse extending over the third and fourth signal intervals, corresponding to the long pulse shown in curve B, which is routed to relay 33 of the printer. The retention of the armature of relay 17 against its plus contact during the fourth interval prevents the usual reversal of current in the circuit for relay 20 and the current therein is again positive as shown in curve D. As brush 38 reaches segment 9 for the beginning of the fifth interval, the armature of relay 20 is still resting against its negative contact as positioned during the third interval and negative current will again pass through winding 19 as shown in curve C, but at this time as will be noted in curve B the long positive pulse is terminated and a long negative pulse is building-up in winding 18. The armature of relay 17 will now respond to the negative current in winding 19 and will move to its minus contact and there remain for the duration of the long negative pulse. When brush 38 reaches segment 10 for the latter half of the fifth interval a reversal of current is effective in the circuit completed through relay 20 and this current as shown in curve D, will be negative. It will be noted that the polarities of the pulses in curve D are the same as those of the combination selected for describing the operation of the system over the channel represented by printer 50.

Curve E represents the currents flowing through the winding of printer relay 33, which correspond to those routed through relay 20, as shown in curve D, and are directly controlled by the operations of relay 17. The armature of relay 17 remains against either of its contacts for the time required by brush 38 to pass over at least two of the segments of ring 28 and therefore the pulses through relay 33 will be for the duration of the full signal intervals.

In curve F are shown the pulses which correspond to the signals as originally transmitted and which are received on the selector magnets of the printer. As is well known in the art only the center portion of each unit impulse of the received signals is made effective for selection, so that any chatter on relay contacts or other irregularities in the signals may not cause false operation of the selector magnets in the printer. Thus, curve F represents the portions of the signals as shown in curve E which actuate the printer selector magnets. The length of these impulses is determined by the length of the receiving distributor segments 31 and is usually made equal to one half the length of the unit signaling impulses.

What is claimed is:

1. In a signaling system, the combination of two unbiased polar relays, each having a local energizing winding, an armature, and current supply contacts cooperating with the armature, a continually rotating distributor, an energizing circuit for the local winding of each relay extending through the distributor, the current supply contacts and the armature of the other relay, said circuits being alternately completed by the rotation of the distributor whereby the armatures are caused to vibrate under the control of the distributor, a line winding on one of said relays arranged to prevent the vibration of said armatures, and an energizing circuit for said line winding independent of said distributor.

2. In a signaling system, the combination of an incoming transmission line and a relay comprising a line winding, an armature, current supply contacts cooperating therewith, and a local circuit winding arranged to produce a magnetic effect on said armature sufficient to cause the movement thereof, a continually rotating distributor, an auxiliary relay, an armature therefor, an operating winding arranged to produce a magnetic effect on said auxiliary relay armature sufficient to cause the movement thereof, current supply contacts cooperating with said auxiliary relay armature, an energizing circuit for said local circuit winding partially completed through the auxiliary relay armature and subsequently completed upon the rotation of said distributor, whereby the armature of the first mentioned relay is caused to reverse its position, an energizing circuit for the operating winding of said auxiliary relay partially completed through the first mentioned armature and subsequently completed upon the further rotation of said distributor whereby the armature of said auxiliary relay is caused to reverse its position, and an energizing circuit for said line winding, independent of said distributor, arranged when energized to predominate over the circuit for said local winding thereby preventing further reversals of said armatures.

3. In a telegraph system, a long transmission line, an amplifier for the signal current impulses incoming over said line, a polar signal relay non-responsive to the incoming pulses of unit length but responsive to the amplified pulses of two or more units length, an armature and cooperating current supply contacts, an unbiased polar vibrating relay having a holding and a local vibrating winding, an armature, and cooperating current supply contacts, a continually rotating distributor, an energizing circuit for said holding winding including the armature and either of said contacts of said signal relay but independent of said distributor, controlled by said signal relay and arranged to control said vibrating relay, an unbiased polar auxiliary relay having a local winding, an armature and cooperating current supply contacts, an energizing circuit for each of the local windings of the unbiased relays extending through the distributor, a current supply contact and the armature of the other relay, said circuits being alternately completed by the rotation of the distributor whereby the armatures of said unbiased relays are caused to vibrate under the control of the distributor provided the energizing circuit through the said holding winding is open.

4. In a telegraph system, a long transmission line, an amplifier for signal current impulses incoming over said line, a polar relay comprising an armature and current supply contacts of opposite polarities non-responsive to the amplified incoming pulses of unit length but responsive to the amplified pulses of two or more units length, a circuit comprising said armature and either of said contacts, the contact selected being dependent upon the polarity of the incoming pulse, a distributor comprising two segmented rings and a rotating brush interconnecting said rings, and a local vibrating circuit comprising two polarized relays and said segmented rings arranged when energized to provide pulse currents of unit length and of alternate polarities, the first mentioned circuit when energized being adapted to control said vibrating circuit independently of said distributor and to substitute the incoming pulses of two or more units length for the local pulses of unit length.

5. In a telegraph system, a long transmission line, an amplifier for signal current impulses received over said line, a polar signal relay responsive to only amplified incoming pulses of two or more units length, an armature and cooperating current supply contacts of opposite polarities, said armature being adapted to engage either of said contacts in accordance with the polarity of the incoming pulse, a polar vibrating relay having a vibrating and a holding winding, an armature and current supply contacts of opposite polarities cooperating therewith, an energizing signal circuit comprising the armature and contacts of said signal relay and the holding winding of said vibrating relay, a polar auxiliary relay having a vibrating winding, an armature and current supply contacts of opposite polarities, a distributor comprising two segmented rings and a rotating brush adapted for interconnecting said rings, a printer, and a local vibrating circuit including said vibrating windings and said segmental rings arranged to send to said printer pulses of unit length and of alternate polarities except when said signal circuit which is energized independently of said distributor, is closed to insert the pulses of two or more units length as actually received.

6. In a telegraph system, a distributor, a relay including an armature, a local circuit, a second relay arranged to produce a magnetic effect on the armature of said first relay in accordance with the movement thereof, said local circuit including said distributor and receiving magnets, and means including said distributor for operating said receiving magnets in accordance with the operation of said first relay.

7. In a telegraph system, a plurality of receiving magnets, electro-magnetic means including armatures therefor for transmitting impulses of varying character to said magnets, a distributor, means including said distributor for operating the armatures of said electro-magnetic means, each electro-magnetic means being under the control of the other, and means for controlling said armatures of said electro-magnetic means in response to impulses received over a cable or signaling line.

8. In a telegraph system, a cable or signaling line over which signaling impulses are received, a plurality of receiving devices, electro-magnetic means, a distributor, means including said electro-magnetic means and said distributor for operating said receiving devices in accordance with the operation of said electro-magnetic means, means including said distributor for operating each of said electro-magnetic means under control of the other of said electro-magnetic means, and means for controlling the operation of said electro-magnetic means in accordance with impulses received over said cable or line.

9. In a telegraph system, a signaling line over which the signaling impulses transmitted are so attenuated that the dot impulses are lost, receiving electro-magnetic means including armatures with circuits whereby each such electro-magnetic means controls the other, printer magnets, means including the armatures of said electro-magnetic means for operating said printer magnets in accordance with the signals transmitted over said signaling line, said means including a distributor, and means together with said distributor whereby the armatures of the electro-magnetic means move in response to the received impulses.

10. In a signaling system, a transmission line over which the signaling impulses transmitted are so attenuated that the dot impulses are not received, a plurality of printer magnets, a first and a second electro-magnetic means, each of said electro-magnetic means being under the control of the other over circuits including a normally operating periodic circuit interrupting device, means for operating said electro-magnetic means in response to impulses received over said signaling line, and means for operating said printer magnets, under control of said electro-magnetic means, said means including a normally operating periodic circuit interrupting device.

11. In a signaling system, a signaling line over which impulses transmitted are so attenuated that the impulses of dot character are not fully received, electro-responsive devices, a first and a second electro-magnetic means, a distributor, means including said distributor for operating each of said electro-magnetic means under control of the other, means including said distributor for operating said electro-responsive devices under the control of said electro-magnetic means, and means whereby said devices are operated in accordance with the impulses transmitted over said signaling line.

12. In a telegraph system, a signaling line over which the signaling impulses are attenuated, a plurality of receiving magnets, electro-magnetic means, a distributor, means including said electro-magnetic means and said distributor for operating said receiving magnets in accordance with the operation of said electro-magnetic means, and means independent of said distributor for operating said electro-magnetic means in accordance with received impulses.

13. In a telegraph system, a distributor, a first relay including an armature, a local circuit, a second relay, means including said local circuit arranged to produce a magnetic effect on the armature of said first relay to cause movement of the armature, said local circuit being independent of said distributor and receiving magnets, and means including said distributor for operating said receiving magnets in accordance with the operation of said first relay.

14. In a telegraph system, the combination with a signaling line over which the signaling impulses transmitted are so attenuated as not to be received, and electro-magnetic means including an armature therefor at said receiving end for relaying said impulses, said electric-magnetic means being arranged to move the armature only in response to the received signals.

15. In a telegraph system, a signaling line over which impulses transmitted are attenuated, a first and a second electro-magnetic means, receiving magnets, means including said electro-magnetic means for transmitting impulses of a reversed polarity to said receiving magnets, each of said electro-magnetic means being under the control of the other and means for operating said electro-magnetic means in accordance with the impulses impressed on said signaling line.

16. An impulse receiving system comprising an incoming line, a relay (17) having a line winding energized by impulses arriving over said line, a vibrating winding for reversing said relay, a distributor unit comprising a brush and a series of segments over which said brush passes, certain of said segments being connected in an energizing path including said vibrating winding, a second relay (20) having its winding connected by a conductive connection to an intermediate segment of said distributor unit, a source of E. M. F. connected to said distributor unit whereby current flowing in said vibrating winding urges the armature of said first named relay to its opposite position as said brush makes contact with certain of said segments and connections to said intermediate segment whereby said second named relay responds to the motion of the armature of said first named relay when said brush makes contact with said intermediate segment.

17. In combination, an incoming cable terminal, a relay having a line coil controlled by impulses over said cable, said relay having a reversing coil and an armature, a distributor comprising segments, certain of said segments being connected to the contacts of said relay and to the control winding of another relay through a brush traversing said segments, and a circuit connection from the distributor to the winding of said other relay whereby said other relay follows all the motions of said line relay.

In witness whereof, I hereunto subscribe my name this 16th day of November, 1928.

MARK B. KERR.